United States Patent [19]

Chaplin et al.

[11] Patent Number: 4,908,699
[45] Date of Patent: Mar. 13, 1990

[54] COMPONENT VIDEO ACCUMULATION EFFECT

[75] Inventors: Daniel J. Chaplin, Nevada City; Paul M. Trethewey, Penn Valley; Christopher R. Hansen, Grass Valley; R. Barry Angell, Nevada City, all of Calif.

[73] Assignee: The Grass Valley Group, Inc., Nevada City, Calif.

[21] Appl. No.: 299,290

[22] Filed: Jan. 23, 1989

[51] Int. Cl.⁴ .............................................. H04N 9/74
[52] U.S. Cl. .................................................... 358/22
[58] Field of Search .................................... 358/22, 30

[56] References Cited

U.S. PATENT DOCUMENTS 4,698,666  10/1987  Lake .................................... 358/22
4,752,821   6/1988  Poetsch ................................ 358/22

Primary Examiner—Tommy P. Chin
Attorney, Agent, or Firm—Francis I. Gray

[57] ABSTRACT

A method for accumulating component video signals non-additively adds the luminance components to produce an accumulated luminance component, and additively adds the chrominance components to produce an accumulated chrominance component. The accumulated chrominance component may be clipped to limit chrominance values in an overlap area to legal color values. The intentional overlap of the component video signals produces an accumulation special effect in the overlap area.

7 Claims, 2 Drawing Sheets

COMPONENT VIDEO ACCUMULATION EFFECT

BACKGROUND OF THE INVENTION

The present invention relates to video keyers, and more particularly to a component video accumulation effect for combining, or accumulating, key sources and video fill signals to reduce the number of mixers required, the effect producing a predictable visual effect where the different component video signals overlap.

An output video signal that is displayed on a television monitor may consist of a combination of different video signals from different sources. For example a foreground video signal may be cut to appear in front of a background video signal and characters from one or more character generators may be cut to overlay the entire video image. For each video source there is a video signal and an associated key signal that determines where each video signal appears in the output video signal. Conventionally each combination of two video sources requires a separate mixer with the appropriate key signal. In composite television a technique has been developed to accumulate one or more key sources and video fill signals so that only a single keying mixer is required to insert them into a background video signal. This is accomplished by the use of a non-additive mixer (NAM) having the key signals or video signals as inputs to produce a single output key signal and video signal that is input to the single keyed mixer for combination with the background video signal. This is possible because the entire composite video signal is positive with respect to a blanking level. However in component video, although the luminance component is positive with respect to the blanking level, the chrominance components may have either a positive or a negative value with respect to the blanking level. Therefore straight forward non-additive mixing of the bipolar chrominance components is not possible.

In the composite video arena when the video signals from different sources are accumulated at an overlap area between the respective key signals, improper color gamut signals may occur resulting in an unpredictable color result. This occurs because the video signal having the highest instantaneous voltage level is displayed, and where the voltage levels are close together the subcarrier component may alternate between the two video signals.

Therefore what is desired is a method of accumulating component chrominance signals so that a single key mixer may be used for a multiple video fill mix, and also so that a predictable, pleasing and legal color results when the video signals overlap.

SUMMARY OF THE INVENTION

Accordingly the present invention provides a component video accumulation effect that combines the chrominance components from multiple video signal sources in a predictable manner while providing legal, pleasing colors where the video sources overlap. The luminance components are non-additively mixed, as are the associated key signals. However the chrominance components are additively mixed. The resulting accumulated chrominance component may be subsequently amplified and clipped to limit the peak chrominance values. The accumulated luminance, chrominance and key components are then input to a three channel keying mixer for insertion into a component background video signal.

The objects, advantages and other novel features of the present invention are apparent from the following detailed description when read in conjunction with the appended claims and attached drawing.

DESCRIPTION OF THE PREFERRED EMBODIMENT

Figure 1:
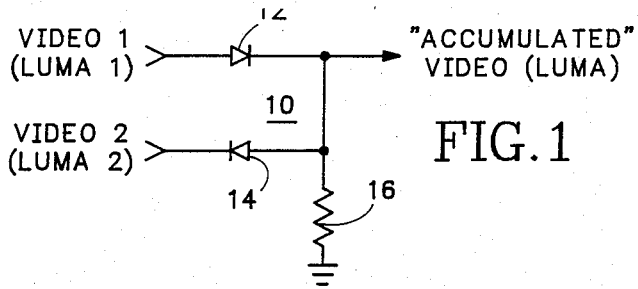
FIG. 1 is a schematic diagram of a non-additive mixer.
Figure 2:
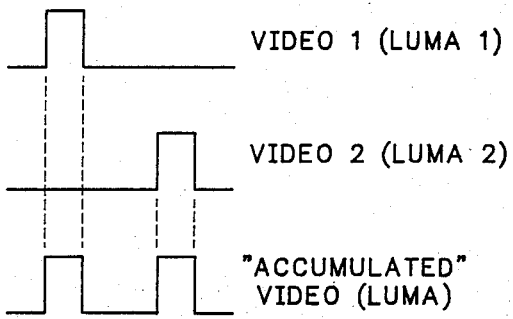
FIG. 2 is a waveform diagram illustrating the operation of the non-additive mixer of FIG. 1.

Referring now to FIG. 1 a non-additive mixer 10 is shown having a pair of video signals input to the anodes of respective diodes 12, 14. The cathodes of the diodes are connected to one end of an output resistor 16, the other end of the output resistor being connected to a voltage rail, such as ground. For video signals that are spatially exclusive as shown in FIG. 2, only one of the diodes 12, 14 conducts at any given instant. The "accumulated" video output is zero where both video sources are zero, is a mirror of the first video source where the amplitude is greater than that of the second video source, and is a mirror of the second video source where the amplitude is greater than that of the first video source. This is a conventional non-additive mixing circuit that may be used for unipolar, positive signals such as composite video signals, component luminance signals and key signals.

Figure 3:
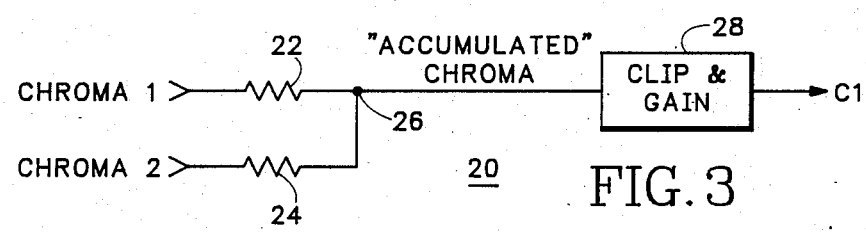
FIG. 3 is a schematic diagram of an additive mixer for the chrominance component according to the present invention.
Figure 4:
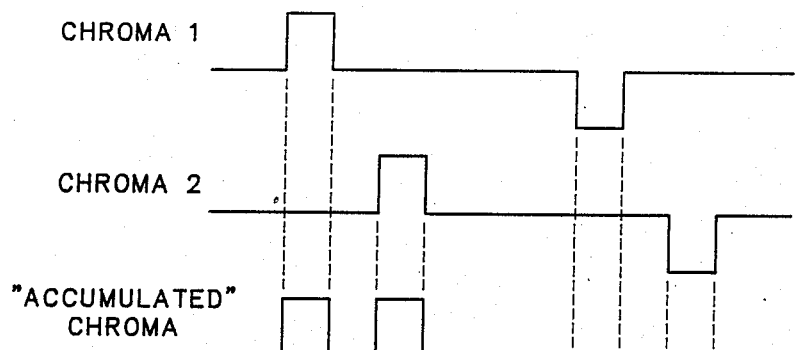
FIG. 4 is a waveform diagram illustrating the operation of the additive mixer of FIG. 3.

FIG. 3 illustrates an additive mixer 20 having a pair of chrominance signals input to one end of respective resistors 22, 24. The opposite ends of the resistors are connected together at a summing node 26. Also connected to the summing node is an optional clip and gain circuit 28 to provide amplification for the "accumulated" chrominance signal from the summing node 26 and to limit the amplitude of the "accumulated" chrominance signal to allowable values. As shown in FIG. 4 for chrominance signals corresponding to the luminance signals of FIG. 2, the chrominance signals have both negative as well as positive values. Where the signals are spatially distinct, one of the chrominance signals is zero while the other has some non-zero value so that when added together the resulting output is zero where both chrominance signals are zero, and equal to one or the other chrominance signal where the respective signals are non-zero.

Figure 5:
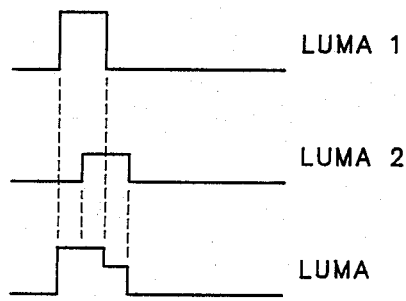
FIG. 5 is a waveform diagram illustrating the operation of the non-additive mixer of FIG. 1 where the luminance components overlap.
Figure 6:
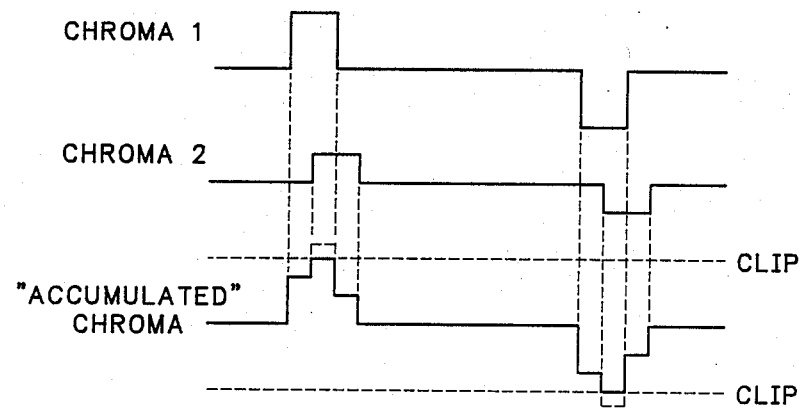
FIG. 6 is a waveform diagram illustrating the operation of the additive mixer of FIG. 3 where the chrominance components overlap.

In the overlapping situation shown in FIGS. 5 and 6 the luminance reflects the largest amplitude between the two luminance signals so that when non-additively mixed the resulting luminance signal is as shown in FIG. 5. However the chrominance signals are additively mixed, resulting in a potentially larger amplitude chrominance signal during the overlap period. To prevent illegal colors caused by too large amplitudes, a clip signal is applied. The result of such an overlap between video signals is to have one video signal on one side of the overlap and the other video signal on the other side of the overlap. Where the signals overlap the resultant video signal has the luminance value of the original signal having the highest luminance value and a chrominance value that is a function of the relative values of the original chrominance values, i.e., the sum of the individual chrominance values. This results in an alteration of the chrominance signal in the overlap area.

Figure 7:
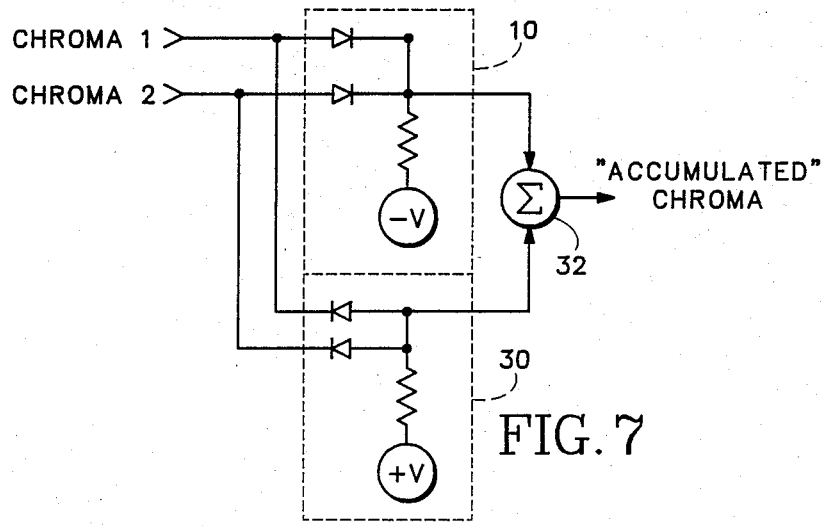
FIG. 7 is a schematic diagram of a combination non-additive and additive mixer for the chrominance component according to the present invention.

Other functions besides addition may be used that would provide different results, i.e., subtraction, multiplication and the like. One possible function is shown in FIG. 7 where two non-additive mixers are combined to form a bipolar non-additive mixer. The positive values of chrominance are combined non-additively by the first NAM 10 that is identical to the luminance NAM of FIG. 1 where the load resistor is connected to a negative voltage rail. The negative values of chrominance are combined non-additively by a second NAM 30 that is similar to the luminance NAM of FIG. 1, but with the polarity of the diodes reversed and the load resistor connected to a positive voltage rail. The outputs of the two NAMs are then combined by an adder 32 to produce the "accumulated" chrominance signal. This configuration has the advantage that the chrominance signals are automatically clipped, removing the requirement for a downstream clipping stage. Complementary colors tend to mix to neutral tones, which is what would happen if luminance were added, and noisy black signals do not contribute as much to the final image.

Thus the present invention provides a method of combining component video key fill signals by non-additively combining the luminance components and associated key signals while additively combining chrominance components to produce an "accumulated" video signal that may subsequently be inserted into a component background video signal using a single three-channel keying mixer. The video fill signals may be allowed to overlap to produce a pleasing new color combination in the overlap area.

What is claimed:

1. A method for accumulating component video signals, each having a luminance component and a chrominance component, comprising the steps of:
   non-additively mixing the luminance components of the component video signals to produce an accumulated luminance component; and
   additively mixing the chrominance components of the component video signals to produce an accumulated chrominance component.

2. A method as recited in claim 1 further comprising the step of clipping the accumulated chrominance component to limit the accumulated chrominance component to legal color values.

3. An apparatus for accumulating component video signals each having a luminance component and a chrominance component comprising:
   means for non-additively mixing the luminance components of the component video signals to produce an accumulated luminance component; and
   means for additively mixing the chrominance components of the component video signals to produce an accumulated chrominance component.

4. An apparatus as recited in claim 3 further comprising means for clipping the accumulated chrominance component to limit the accumulated chrominance component to legal color values.

5. An apparatus as recited in claim 3 wherein the additively mixing means comprises:
   means for non-additively mixing positive values of the chrominance components to produce a positive chrominance component;
   means for non-additively mixing negative values of the chrominance components to produce a negative chrominance component; and;
   means for combining the positive and negative chrominance components to produce the accumulated chrominance component.

6. A method for producing an accumulation special effect from a plurality of component video signals, each having a luminance component and a chrominance component, comprising the steps of:
   intentionally overlapping the component video signals to produce an overlap area;
   non-additively mixing the luminance components to form an accumulated luminance component;
   additively mixing the chrominance components to form an accumulated chrominance component:
   whereby the accumulation special effect occurs in the overlap area where the luminance values reflect the luminance components having the highest luminance values and the chrominance values are a mix of the chrominance values from the chrominance components.

7. A method as recited in claim 6 further comprising the step of clipping the accumulated chrominance component to limit the accumulated chrominance component to legal color values within the overlap area.

* * * * *